April 29, 1930.  T. A. ZIELINSKI  1,756,618
WINDSHIELD WIPER
Filed July 9, 1928
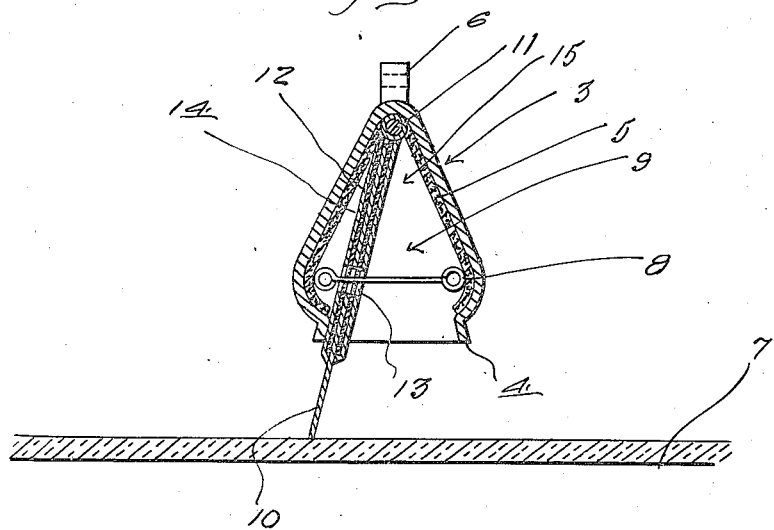
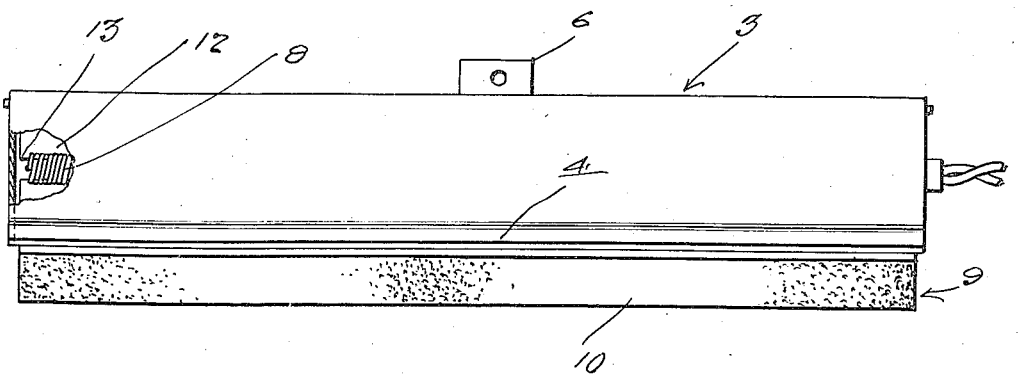
Inventor
T. A. Zielinski
By Clarence A. O'Brien
Attorney Patented Apr. 29, 1930

1,756,618

UNITED STATES PATENT OFFICE

THEODORE A. ZIELINSKI, OF DETROIT, MICHIGAN

WINDSHIELD WIPER

Application filed July 9, 1928. Serial No. 291,245.

This invention relates to an improved windshield wiper which is especially, but not necessarily adapted for use in association with automobile windshields.

The purpose of the invention is to provide an improved wiper characterized by novel details associated in a particular manner for removing condensation from the surface of the windshield in a more dependable manner than heretofore known.

My principal aim is to generally improve upon inventions of this class by providing one which is highly efficient in performance, smooth and dependable in action, simple and inexpensive to both the manufacturer and the user, and a structure which is characterized by a practical wiper and heat applicator.

Other features and advantages of the invention will become more readily apparent from the following description and drawings In the drawings:

Figure 1 is a cross section through a device constructed in accordance with this invention, showing the approximate manner in which it is associated with a windshield.

Figure 2 is an elevational view of the frame with a portion of the casing broken away to disclose one of the electric heating coils.

In carrying out the invention I provide a hollow metal casing 3, of general elongated configuration, whose opposite side walls are disposed in rearwardly diverging relation, thus making the casing somewhat V shaped or triangular in cross section. The rear side of the casing is opened to provide a heat discharge mouth, around the margin of which is an inclined flange 4 on each side of the flanges cooperating as stops. This casing is internally lined with asbestos 5, and it is provided with a lug 6, adapted to be connected with appropriate operating means (not shown). Incidentally the casing is adapted to swing in an arc across the surface of the windshield glass 7 in a conventional manner, the flared mouth being disposed in close spaced proximity to the windshield. Located in the casing and in spaced relation from the stop flanges 4 are spaced parallel electrical heating coils 8, receiving current from conducting wires 16. It is to be noted that these coils are nested in the pocket like formation adjacent to the top flanges 4.

Swingably mounted in the casing is a wiper generally designated by the reference character 9. This comprises the rubber squeegee 10 projecting beyond the open mouth and hingedly mounted in the apex portion of the casing as represented at 11.

This rubber washer is faced on opposite sides with sheets of asbestos 12 to prevent burning of the rubber when it comes into close relationship with the heating coil. It is to be noted that the nested disposition of these coils and their relationship with respect to the flanges 4, prevents the wiper from playing over too far and into contact with the coils. It is to be noted also that the ends of the wiper are notched, as at 13, to accommodate the connecting wires between the ends of the coils.

It is evident that the casing and wiper are formed as a unit, but the wiper is relatively movable during this swinging action with respect to the casing. Thus it divides the casing into compartments 14 and 15 respectively. When the wiper assumes the position shown in Figure 1, it is obvious that heat is confined within the compartment 14. When however, it swings to the opposite side of the casing, the heat is confined within the compartment 15.

It is obvious that with this arrangement, when the wiper bears the relationship to the casing shown in Figure 1, the heat from the right hand electric coil passes out unobstructedly against the windshield glass in advance of the path of movement of the squeegee strip 10.

As before indicated, heat is trapped in the compartment 14 at this time. When the stroke of the operating means is reversed, the position of the wiper is also reversed, so that the heat now flows from the compartment 14, in advance of the wiper moving toward the left and the heat is trapped in the compartment 15. Thus, in case of deposited condensation, the heat applied melts the condensation and the wiper comes along and scrapes it off.

It is submitted that a windshield wiper of this class is desirable for the reasons above stated, and for the principal reason that it maintains the windshield in a desirable condition to promote safe driving.

It is thought, however, that the construction and advantages of the invention are now clear. Hence, a further description is regarded as unnecessary.

Minor changes in the shape, size and rearrangement of parts coming within the field of invention claimed may be resorted to, if desired.

I claim:

1. A windshield wiper of the class described comprising an elongated hollow casing having a longitudinally extending discharge mouth, the side walls of said casing converging rearwardly, the outer longitudinal edges of said walls being bent inwardly and having inclined stop flanges extending for the full length thereof, a wiper hingedly mounted in the apex portion of the casing, and adapted to extend through and beyond the mouth for alternate engagement with the stop flanges, heating elements extending along the walls of the casing, and said wiper being movable with respect to the casing and alternately cooperating with the walls of the casing to provide heat entrapping chambers.

2. A windshield wiper of the class described comprising an elongated hollow casing having a longitudinally extending discharge mouth, the outer longitudinal edges of the side walls of the casing being bent inwardly toward one another for restricting said discharge mouth, a wiper hingedly mounted in the casing, and adapted to extend through and beyond the mouth of the casing for alternate engagement with the inwardly directed end portions of said side walls, heating elements extending along the walls of the casing, said wiper adapted for alternately contacting with the inwardly directed edges of the walls to provide heat entrapping chambers.

In testimony whereof I affix my signature.

THEODORE A. ZIELINSKI.